C. SPRIGG.
MEASURING INSTRUMENT.
APPLICATION FILED NOV. 26, 1907.
917,179.
Patented Apr. 6, 1909.
2 SHEETS—SHEET 1.
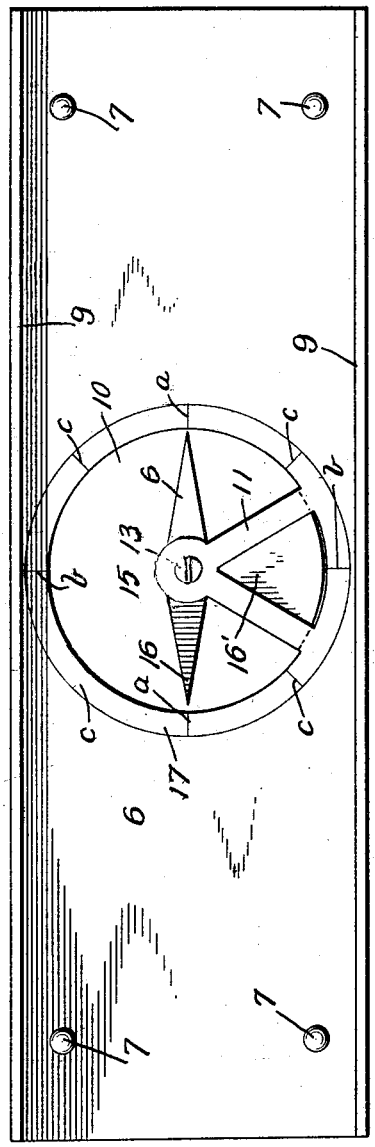

C. SPRIGG.
MEASURING INSTRUMENT.
APPLICATION FILED NOV. 26, 1907.
917,179.
Patented Apr. 6, 1909.
2 SHEETS—SHEET 2.
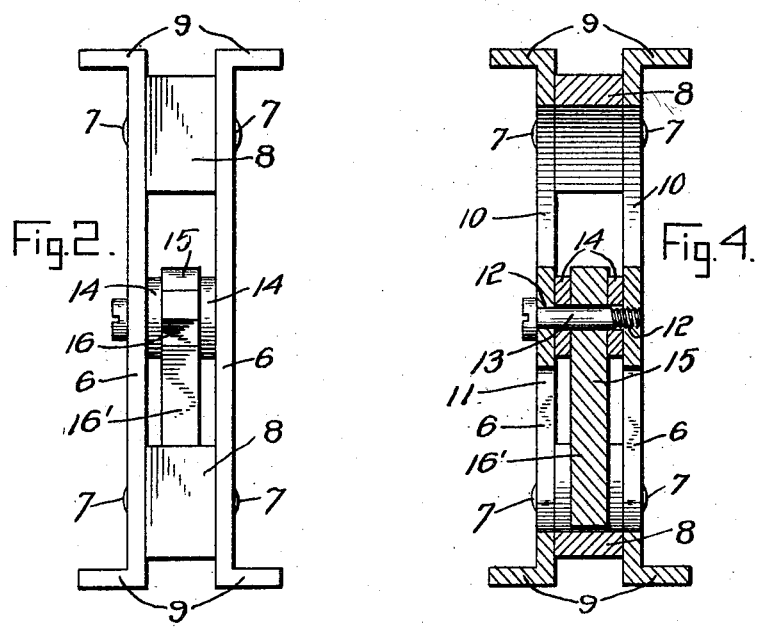
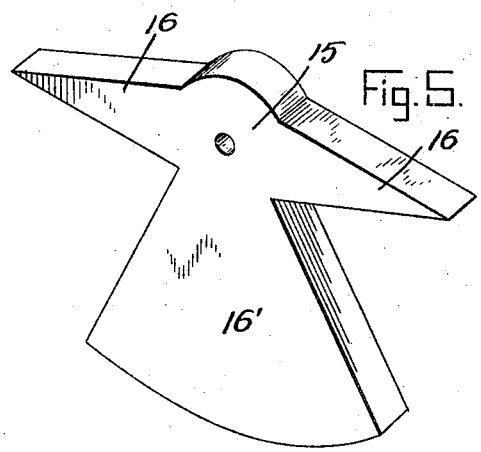
Witnesses
C. H. Reichenbach
Fr. G. Smith
Inventor
C. Sprigg
By
Attorneys

UNITED STATES PATENT OFFICE.

CHARLES SPRIGG, OF ITHACA, NEW YORK.

MEASURING INSTRUMENT.

No. 917,179.     Specification of Letters Patent.     Patented April 6, 1909.

Application filed November 26, 1907. Serial No. 404,003.

*To all whom it may concern:*

Be it known that I, CHARLES SPRIGG, a citizen of the United States, residing at Ithaca, in the county of Tompkins, State of New York, have invented certain new and useful Improvements in Measuring Instruments; and I do hereby declare the following to be a full, clear, and exact description of the invention, such as will enable others skilled in the art to which it appertains to make and use the same.

This invention relates to measuring instruments and more particularly to a combined level, inclinometer, and plumb and the primary object of the invention is to provide an instrument of this class which may be used to determine whether or not building material, when in place, is level, plumb, or the degree to which it is inclined. While a number of such devices have heretofore been thought of, they are objectionable in that the number of separate elements or devices embodied in them is equal to the number of the several operations to be performed by the entire instrument. In my instrument, all of the several operations are performed by the same set of elements or in other words, by the same device.

In the accompanying drawings, Figure 1 is a side elevation of the instrument, Fig. 2 is an end view thereof, Fig. 3 is a vertical longitudinal sectional view in a plane at substantially right-angles to the pivot of the device. Fig. 4 is a detail transverse sectional view through the device taken in a plane with the indicator pivot, and, Fig. 5 is a detail perspective view of the indicator removed from its pivot.

As shown in the drawings, the instrument comprises a pair of plates 6 which are oblong and are secured together in spaced parallel relation by means of bolts 7 which are engaged therethrough and through spacing strips 8 which are interposed between the upper and lower edges of the said plates and extend substantially the entire length thereof. The plates are each provided throughout the extent of their upper and lower longitudinal edges with integral flanges 9 which serve as a base for the instrument when in use as will be readily understood.

The plates 6 are provided intermediate their ends each with an opening 10 which is circular and formed integral with the periphery of the openings are upstanding bearings 11 which are provided, at their upper ends and concentrically of the openings 10, with openings 12 through which a pivot screw 13 is engaged. Hung freely upon this pivot 13 is an indicator, the said indicator being received between washers 14 which are also engaged upon the screw and which serve to space the indicator in proper position between the plates 6. This indicator is in the form of a plate which is indicated by the numeral 15 and which is formed with laterally and oppositely extending pointer arms 16 and with a weight portion 16 which is positioned beneath the pivot for the indicator and serves to properly balance the same.

Stamped or pressed into the plates 6 and surrounding the openings therein are annular scales 17, the scale marks of the scales being arranged to indicate the various degrees into which a circle may be divided. While in the drawings, I have shown the scale marks as arranged only to indicate eight equal divisions of a circle it is to be understood, of course, that I am not to be limited to this method of division as the circle may be divided into a greater or a less number of degrees or divisions.

If the instrument, in its use, is placed upon a level piece of material, the pointers 16 will register with the scale marks which are indicated by the reference character *a* in the drawings and if placed against a piece of material which is plumb, the pointers will register with the scale marks which I have indicated by the character *b* in the drawings, these latter marks being of course at right angles with respect to the marks *a*. If the instrument is placed against a piece of material which is disposed at an inclination of 45°, the ends of the pointers will register with the marks indicated by *c*.

Spirit levels are unreliable or rather inaccurate owing to the fact that they are affected by expansion and contraction and it will be understood that this unsatisfactory feature is overcome in my device. It will further be understood that the device may be used alone or in connection with or upon any surveying or measuring instrument desired, and that I am therefore not to be limited to its use alone.

What is claimed, is—

A level comprising a pair of elongated plates having at their top and bottom edges outwardly presented flanges, and provided intermediate their ends with alined circular and graduated openings, spacing strips between the plates, fastening means passing through the strips and plates for securing said parts together, arms projecting from the aforesaid openings, a pivot carried by said arms, and a weighted pointer mounted on said pivot between the plates, and indicating on the graduations of the aforesaid openings.

In testimony whereof, I affix my signature, in presence of two witnesses.

CHARLES SPRIGG.

Witnesses:
  HERBERT CURRY,
  H. GALLAGHER.